United States Patent
Motoji et al.

(10) Patent No.: US 11,807,185 B2
(45) Date of Patent: Nov. 7, 2023

(54) AIRBAG

(71) Applicant: TOYOTA JIDOSHA KABUSHIKI KAISHA, Aichi-ken (JP)

(72) Inventors: Yuya Motoji, Toyota (JP); Kennosuke Kariya, Kakamigahara (JP); Takafumi Ogasawara, Okazaki (JP); Masahiro Urago, Toyota (JP); Makoto Omura, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/943,203

(22) Filed: Sep. 13, 2022

(65) Prior Publication Data
US 2023/0087296 A1 Mar. 23, 2023

(30) Foreign Application Priority Data

Sep. 17, 2021 (JP) .................. 2021-152590

(51) Int. Cl.
*B60R 21/264* (2006.01)
*B60R 21/232* (2011.01)

(52) U.S. Cl.
CPC .......... *B60R 21/264* (2013.01); *B60R 21/232* (2013.01); *B60R 2021/2648* (2013.01)

(58) Field of Classification Search
CPC .... B60R 2021/2648; B60R 2021/2633; B60R 21/232
See application file for complete search history.

(56) References Cited

U.S. PATENT DOCUMENTS

| 8,439,397 B1* | 5/2013 | Steinbrecher | B60R 21/232 280/730.2 |
| 2004/0251666 A1* | 12/2004 | Shaker | B60R 21/232 280/730.2 |
| 2012/0280478 A1* | 11/2012 | Fink | D05B 35/02 112/475.08 |
| 2014/0375037 A1* | 12/2014 | Arellano | B60R 21/233 280/736 |
| 2020/0108791 A1* | 4/2020 | Ohno | B60R 21/237 |
| 2021/0146872 A1* | 5/2021 | Paddock | B60R 21/213 |
| 2021/0237676 A1* | 8/2021 | Gammill | B60R 21/262 |
| 2021/0237678 A1* | 8/2021 | Gammill | B60R 21/217 |

FOREIGN PATENT DOCUMENTS

| JP | 6613855 B2 * | 12/2019 |
| JP | 6613855 B2 | 12/2019 |

\* cited by examiner

*Primary Examiner* — Paul N Dickson
*Assistant Examiner* — Matthew Joseph Ganci
(74) *Attorney, Agent, or Firm* — HAUPTMAN HAM, LLP

(57) ABSTRACT

An airbag includes a chamber that expands due to gas being introduced at a time of deployment and a non-expanding area that does not expand at the time of deployment, in which the airbag deploys by gas being introduced into the chamber. A first portion inside the chamber that is located around the non-expanding area includes a tip end portion that is closed, and at the time of deployment, the tip end portion applies a load to and becomes in contact with a second portion of the chamber that is located around the non-expanding area and that faces the tip end portion.

7 Claims, 5 Drawing Sheets

A-A

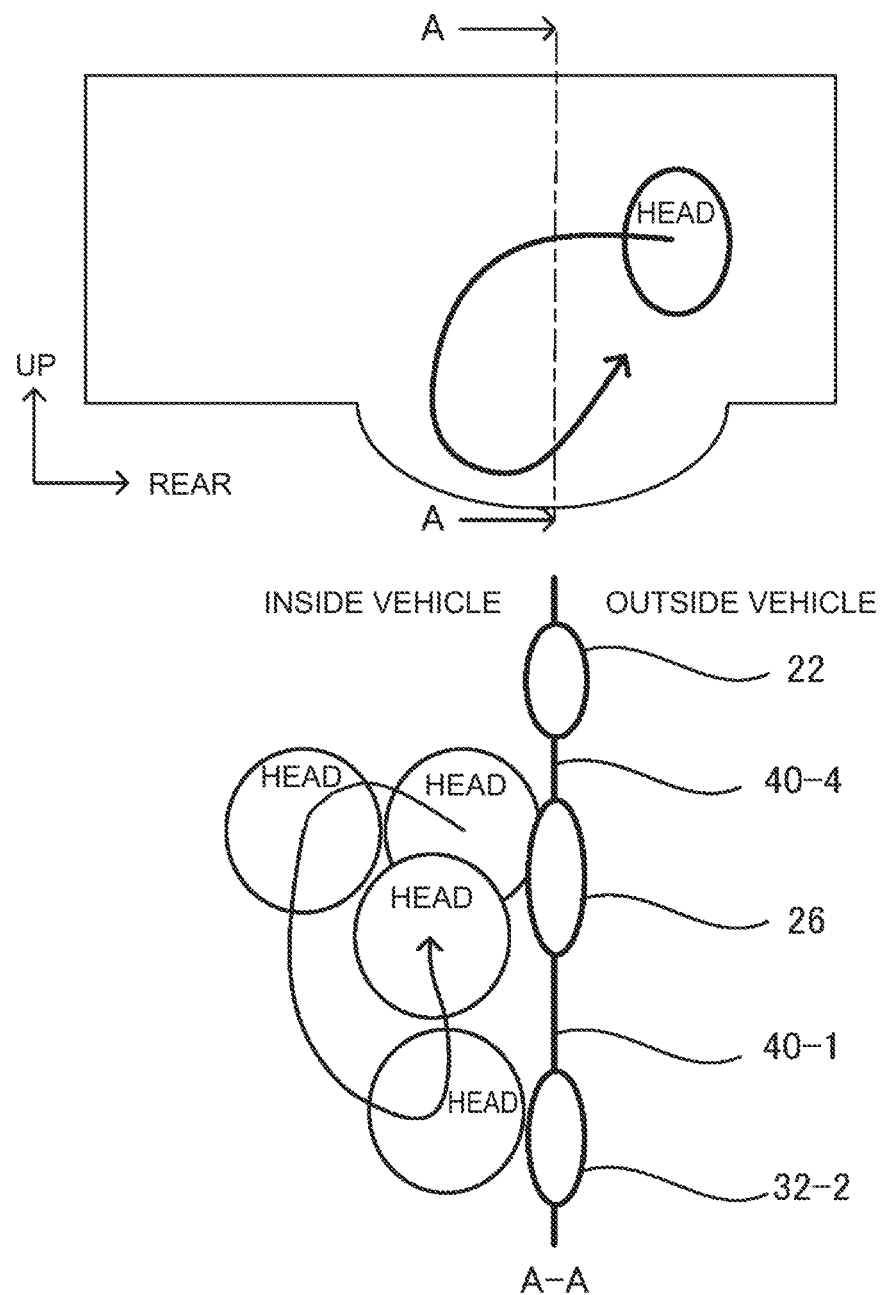

AIRBAG

CROSS-REFERENCE TO RELATED APPLICATION

This application claims priority to Japanese Patent Application No. 2021-152590 filed on Sep. 17, 2021, incorporated herein by reference in its entirety.

BACKGROUND

1. Technical Field

The present disclosure relates to an airbag that includes a chamber that expands due to gas being introduced at the time of deployment and a non-expanding area that does not expand at the time of deployment, in which the airbag deploys by gas being introduced into the chamber.

2. Description of Related Art

Conventionally, various airbags have been proposed and installed in vehicles to protect occupants in the event of a collision. Here, a storage location and a deployment location of the airbag differ depending on its purpose and function. U.S. Pat. No. 6,613,855 (JP 6613855 B) discloses an airbag regarding a curtain airbag for protecting a side of a rear seat occupant, and the airbag deploys a chamber from the curtain airbag to a vehicle inner side and toward the occupant to receive not only a side but also a front (face).

SUMMARY

In such a curtain airbag or the like, a large airbag having a wide protection range is required in order to provide a portion for face protection. In addition, even if it is not for face protection, in the above-mentioned curtain airbag, when the occupant in the rear seat is a woman of small stature, the width of the curtain airbag needs to be widened in a vertical direction so that the occupant does not slip under the airbag. In particular, in the case of an offset front collision of the vehicle (a front collision of only a part of a front part of the vehicle), since the vehicle rotates, there is a possibility that the occupant is shaken by the rotation and slips through the curtain airbag.

Thus, in order for the airbag to expand widely, more gas is required. Therefore, an inflator is required to have a high output.

An airbag according to the present disclosure includes a chamber that expands due to gas being introduced at a time of deployment and a non-expanding area that does not expand at the time of deployment, in which the airbag deploys by gas being introduced into the chamber, in which a first portion inside the chamber that is located around the non-expanding area includes a tip end portion that is closed, and at the time of deployment, the tip end portion applies a load to and becomes in contact with a second portion of the chamber that is located around the non-expanding area and that faces the tip end portion.

A recess portion may be provided in a portion of the second portion that faces the tip end portion, and the tip end portion may come into contact with the recess portion so as to enter the recess portion.

At the time of deployment, tension in a direction spreading toward a periphery may be applied to the non-expanding area due to the chamber around the non-expanding area expanding.

At the time of deployment, the first portion may have a U-shape in which one end is the tip end portion, the second portion may be located so as to close an opening of the U-shape of the first portion, and an inner portion surrounded by the first portion and the second portion may be the non-expanding area.

The airbag may be a curtain shield airbag that is placed on a vehicle cabin inner side and deploys in a vehicle front-rear direction.

With the airbag according to the present disclosure, a range of coverage can be expanded without increasing a volume of the chamber too much.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a diagram showing a state of an embodiment shown in FIG. 2A, in which a head of an occupant in the rear seat is shaken toward a window in an offset collision (asymmetric collision) in which only a part of the front surface of the vehicle collides;

DETAILED DESCRIPTION OF EMBODIMENTS

Hereinafter, an embodiment of the present disclosure will be described with reference to the drawings. The present disclosure is not limited to the embodiment described below.

Overall Configuration

Figure 1:
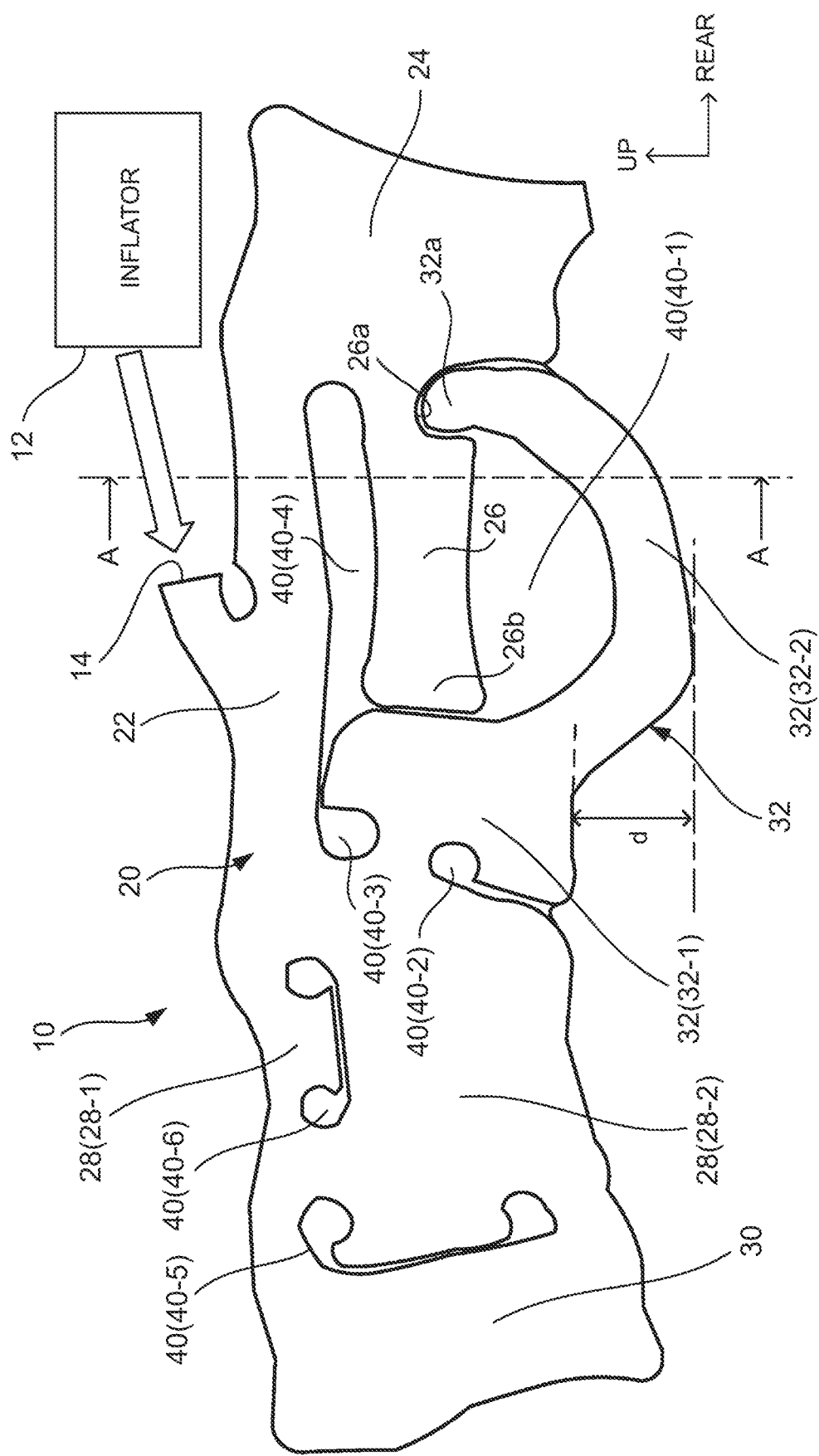
FIG. 1 is a diagram showing a shape of a deployed state of an airbag according to an embodiment.

FIG. 1 is a diagram showing a shape of a deployed state of an airbag according to an embodiment. This airbag is a curtain airbag (curtain shield airbag: also called a CSA) located so as to cover a window on a vehicle cabin inner side of a vehicle. In the deployed state, an airbag 10 is also expanded in a thickness direction.

The airbag 10 has a rectangular shape that is long in a vehicle front-rear direction as a whole, and is positioned on windows on sides of a front seat and rear seats of the vehicle so as to hang down from above. That is, an upper side of the airbag 10 is fixed to a side end portion (a portion above the window) of a ceiling.

The airbag 10 forms a chamber 20 with an airtight base cloth (usually synthetic fiber) in the shape of a bag, and introduces air from an inflator 12 into the chamber 20 to expand. Further, the chamber 20 is divided into a plurality of chambers, and a non-expansion area 40 that is appropriately composed of a base cloth and that to which air is not introduced is provided between the plurality of chambers.

An introduction port 14 is a portion that receives gas from the inflator 12, and a conduit from the inflator 12 is connected to the introduction port 14. The introduction port 14 is connected to an entrance chamber 22 of the chamber 20. The entrance chamber 22 is a horizontally long chamber, and the introduction port 14 is connected to an upper center portion thereof. A rear chamber 24 is connected to a rear side of the entrance chamber 22. The rear chamber 24 is close to a square as a whole and extends rearward and downward from a communication portion with the entrance chamber 22 located at an upper portion rear end.

The rear chamber 24 has a communication portion in an intermediate portion of the front side thereof, and a rear end chamber 26 is connected to this communication portion. The rear end chamber 26 is a chamber that is a rectangle that extends forward and terminates and the chamber is closed (a tip is closed) except for the communication portion with the rear chamber 24.

The front side of the entrance chamber 22 is connected to the upper portion rear end of a front chamber 28. The front chamber 28 has a shape close to a square like the rear chamber 24. The non-expanding area 40 (40-6) provided inside is divided into a small chamber 28 (28-1) on the upper side and a large chamber 28 (28-2) on the lower side. The small chamber 28-1 and the large chamber 28-2 communicate with each other on both sides of the rear end and the front end.

A front end chamber 30 is connected to the front side of the small chamber 28-1 of the front chamber 28. The front end chamber 30 has a vertically long rectangular shape extending forward and downward, and its lower portion rear end communicates with the large chamber 28 (28-2). The front end chamber 30 is separated from the large chamber 28-2 by a non-expanding area 40-5.

An intermediate end chamber 32 is connected to an intermediate portion of a rear side of the front chamber 28. The intermediate end chamber 32 narrows after the base portion 32 (32-1) extending from the communication portion with the front chamber 28 to both sides (upward and downward in the figure), and has a U-shaped extending portion 32 (32-2) that extends downward, then rearward, and then upward, and that is terminated.

A tip end portion 32a of the extension portion 32-2 of the intermediate end chamber 32 abuts on a lower side of a base of the rear end chamber 26 (the communication portion with the rear chamber 24). A recess portion 26a that is recessed upward is formed on a lower side of the base of the rear end chamber 26, and the tip end portion 32a of the intermediate end chamber 32 is fitted into the recess portion 26a. In particular, in the expanded state, the chamber 20 is filled with gas (compressed gas) under pressure and is in an expanded state. The intermediate end chamber 32 corresponds to a first portion of the chamber 20 around the non-expanding area 40, and the rear end chamber 26 corresponds to a second portion of the chamber 20 around the non-expanding area 40. More specifically, the tip end portion 32a corresponds to the first portion and the recess portion 26a corresponds to the second portion.

Then, when the tip end portion 32a is fitted into the recess portion 26a, the gap between the two is small, and the rear end chamber 26 surrounding the tip end portion 32a and the recess portion 26a comes into contact (pressure contact) with a load applied. In particular, since the rear end chamber 26 surrounds the tip end portion 32a, the rear end chamber 26 sufficiently receives a force by which the tip end portion 32a expands when the intermediate end chamber 32 is pressed. Thus, when the head of an occupant collides with the intermediate end chamber 32, it can be sufficiently received.

Further, a front tip end portion (front side) 26b of the rear end chamber 26 abuts against a rear side of the base portion 32-1 of the intermediate end chamber 32, and the two abut against each other in an expanded state under pressure.

The intermediate end chamber 32 has a U-shape as a whole, and the configuration is such that the rear end chamber 26 closes the open portion of the U-shape. Further, a space surrounded by the U-shaped intermediate end chamber 32 and the rear end chamber 26 is the non-expanding area 40 (40-1) in which one or a plurality of base cloths into which air is not introduced are superimposed, in which air is not introduced into the non-expanding area 40 (40-1).

When compressed air enters the intermediate end chamber 32, the intermediate end chamber 32 (particularly, the extension portion 32-2) expands toward the outside of the U-shape in an attempt to increase its volume. Thus, a force that pulls the non-expanding area 40-1 outward is applied to the non-expanding area 40-1. Further, the tip end portion 32a of the intermediate end chamber 32 and the tip end portion 26b of the rear end chamber 26 are in contact with facing portions, and a tension of the non-expanding area 40-1 is maintained sufficiently. Therefore, when the occupant's head or the like collides with the non-expanding area 40-1 toward the outside, the tension of the non-expanding area 40-1 can counteract this.

The intermediate end chamber 32 is connected to the front chamber 28 by a relatively narrow communication portion, and then expands once. As a result, although the intermediate end chamber 32 has a small volume, an area that covers an occupant's collision is large. In addition, relatively small non-expanding areas 40 (40-2) and 40 (40-3) having a circular shape are provided on both sides of the root portion of the intermediate end chamber 32 between the rear side of the front chamber 28.

A horizontally long rectangular non-expanding area 40 (40-4) is provided between the rear end chamber 26 and the entrance chamber 22, and thus, the rear end chamber 26 is easily deformed independently. Further, the non-expanding area 40-4 is connected to the non-expanding area 40-3 through a portion where the front end is widened at the base of the intermediate end chamber 32.

In this way, by dividing into many chambers, the movement of each chamber can be regulated to some extent, and it is possible to appropriately respond to the movement of the occupants.

Further, in a defining portion between the front chamber 28 and the front end chamber 30, and a defining portion between the small chamber 28-1 and the large chamber 28-2 of the front chamber 28, the non-expanding areas 40 (40-5) and 40 (40-6) are provided, and are set so that a response to the expansion and collision of each chamber is appropriate.

U-Shaped Intermediate End Chamber

Here, as described above, the intermediate end chamber 32 has a U-shape as a whole, and the extension portion 32-2 protrudes downward (a distance indicated by a symbol d in FIG. 1). An area corresponding to this distance d is allocated by the non-expanding area 40. Thus, the extension portion 32-2 of the intermediate end chamber 32, which is a portion of the chamber 20 protruding downward, can be obtained without increasing the volume of the chamber 20 so much.

Figure 2A:
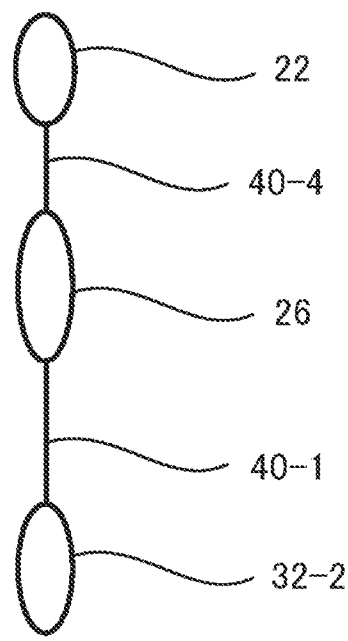
FIG. 2A is a diagram showing a cross section taken along a line A-A in the airbag of FIG. 1.
Figure 2B:
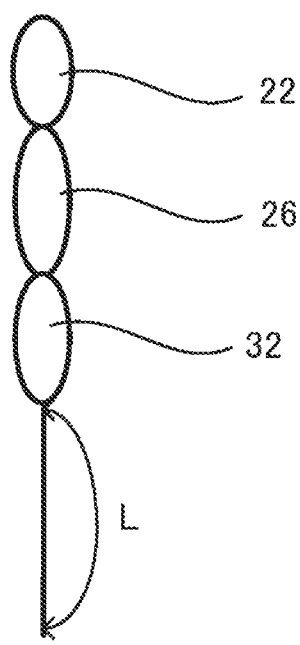
FIG. 2B is a cross-sectional view corresponding to the A-A cross section of the airbag of a comparative example in which non-expanding areas 40-4 and 40-1 are not provided.

FIG. 2A is a diagram showing a cross section taken along the line A-A in FIG. 1. In this way, the non-expanding area 40-4 is arranged between the entrance chamber 22 and the rear end chamber 26, and the non-expanding area 40-1 is arranged between the rear end chamber 26 and the extension portion 32-2. As a result, the range covered by the airbag 10 can be expanded downward. FIG. 2B is a cross-sectional view of a comparative example in which the non-expanding areas 40-4 and 40-1 are not provided, and an area covered by a distance indicated by a symbol L in the figure is smaller than that of the airbag 10 of the present embodiment.

Figure 3B:
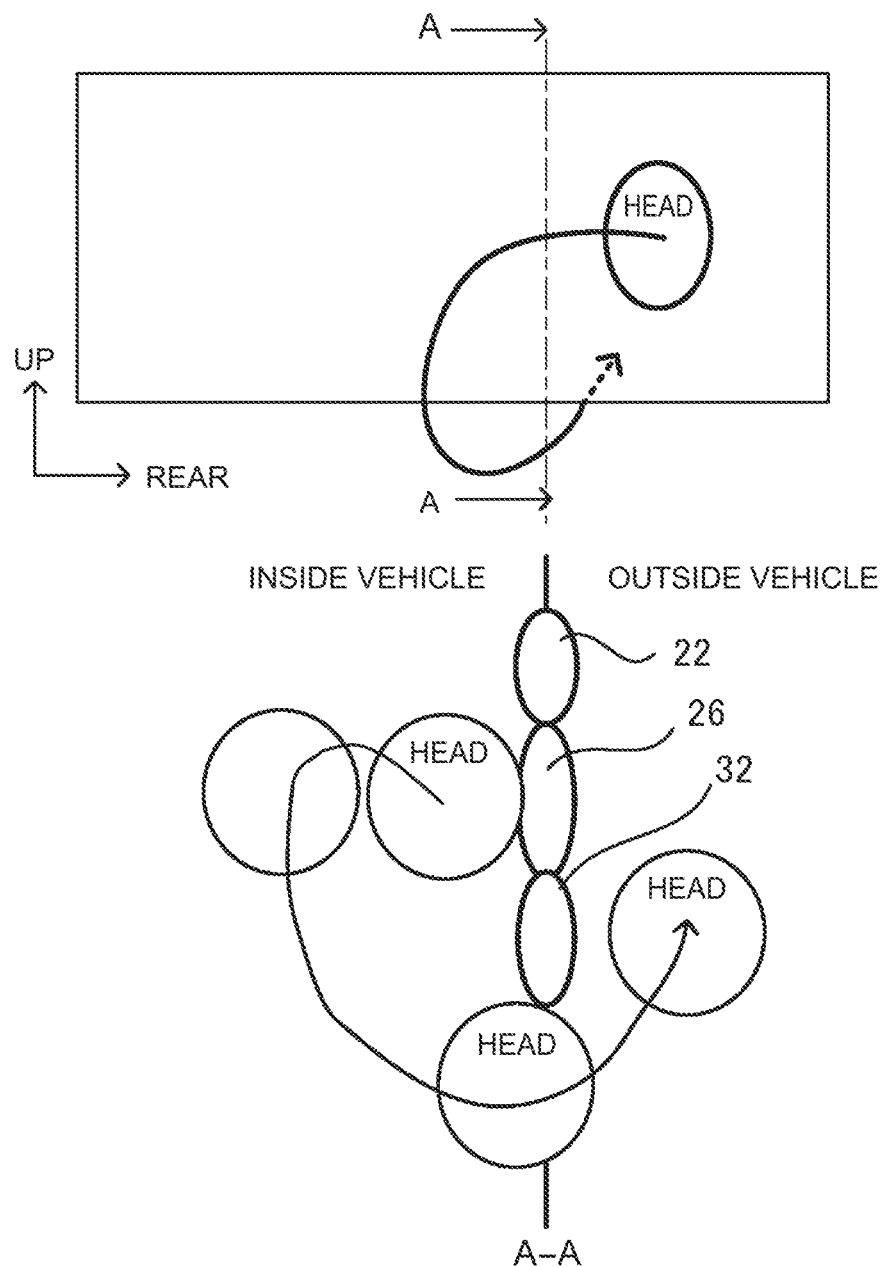
FIG. 3B is a diagram showing a state of a comparative example shown in FIG. 2B, in which a head of an occupant in the rear seat is shaken toward a window in an offset collision (asymmetric collision) in which only a part of the front surface of the vehicle collides.

FIG. 3A and FIG. 3B are diagrams showing a state of an embodiment shown in FIG. 2A, in which a head of an occupant in the rear seat is shaken toward a window in an offset collision (asymmetric collision) in which only a part of the front surface of the vehicle collides. FIG. 3A shows the present embodiment, and FIG. 3B shows the comparative example.

When the vehicle has an offset collision, the collision is detected and the inflator 12 ignites. As a result, gas is generated, which flows into the chamber 20 of the airbag 10. As a result, the chamber 20 expands, the airbag 10 deploys, and each chamber of the chamber 20 expands.

Here, in the case of an offset collision, the vehicle rotates due to the collision. At the beginning of the collision, the head of the occupant in the rear seat collides with, for example, the rear chamber 24 of the airbag 10 and bounces inward. At this time, since the vehicle is rotating laterally, as shown in FIG. 3B, there is a possibility that the head rebounds and swings to a front lower side of the vehicle, slips under the airbag 10, and moves toward the outside of the vehicle, and there is a possibility that the head collides with the window.

In the present embodiment, the airbag 10 is extended downward by the extension portion 32-2. Thus, as shown in FIG. 3A, the occupant's head that rebounds is received by the extension portion 32-2, and the occupant's head can be suppressed from slipping through the airbag 10.

Figure 4A:
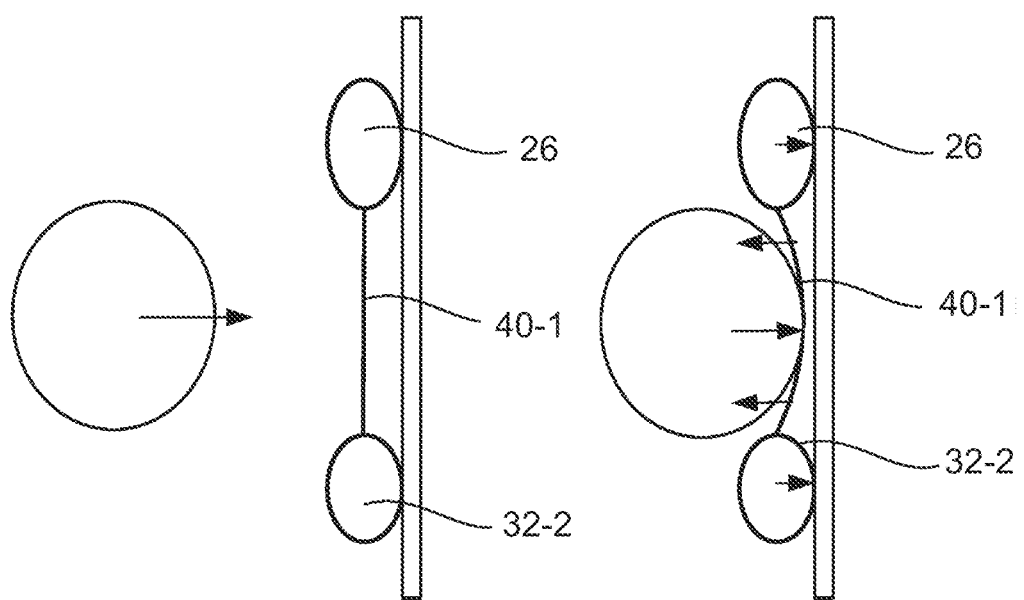
FIG. 4A is a diagram showing a state in which the non-expanding area 40-1 of an airbag 10 according to the embodiment is stretched tight to support the head.

FIG. 4A shows the state of the non-expanding area 40-1 of the airbag 10 according to the embodiment. In this example, as described above, the tip end portion 32a of the extension portion 32-2 is in contact with the recess portion 26a of the rear end chamber 26 under a load, and the extension portion 32-2 becomes wide due to of its large volume. Thus, the non-expanding area 40-1 is in a taut state, that is, in a taut state like a trampoline (trademark).

Therefore, as shown in FIG. 4A, the head can be supported by the non-expanding area 40-1 when the head collides. That is, the rear end chamber 26 of the chamber 20 and the extension portion 32-2 of the intermediate end chamber 32 of the airbag 10 come into contact with the window pane and the like, the movement of the airbag 10 stops, and a reaction force of the non-expansion area 40-1 can further stop the movement of the head.

The non-expansion area 40-4 is also provided on an upper side of the rear end chamber 26. Also in this non-expanding area 40-4, tension is applied by the entrance chamber 22, the rear chamber 24, and the like expanding at the time of deployment, and the head can be received even when there is no air in this portion. Thus, a range covered by the airbag 10 in the vertical direction beside the rear seat can be expanded without increasing the volume of the chamber 20.

Figure 4B:
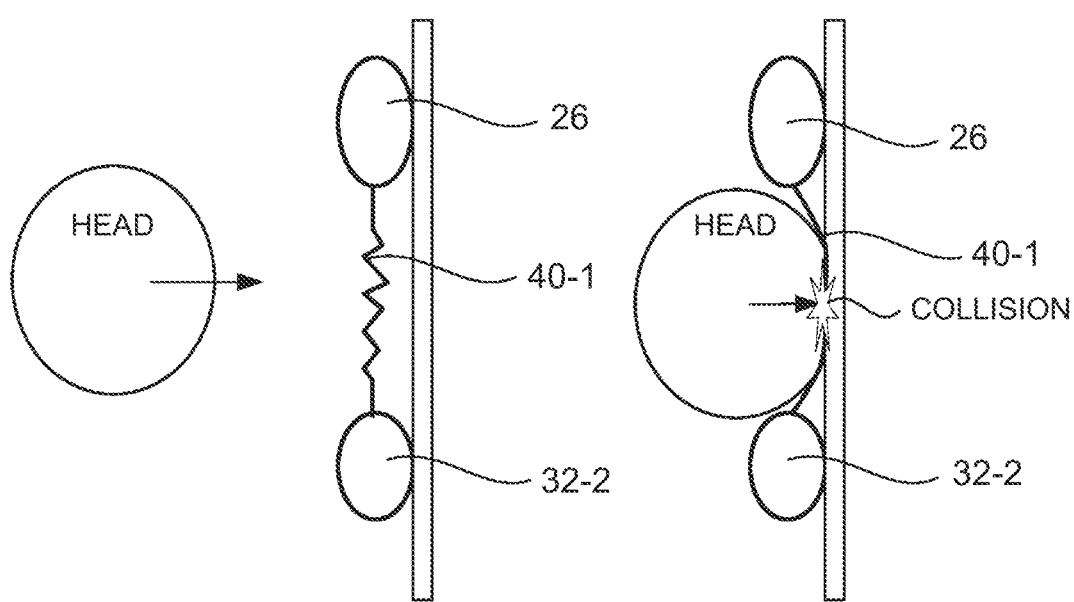
FIG. 4B is a diagram showing a state in which the head collides when the non-expanding area 40-1 is in a state in which the non-expanding area 40-1 is wrinkled and not stretched tight.

FIG. 4B is a diagram showing an example (comparative example) in which the non-expanding area 40-1 is in state in which the non-expanding area 40-1 is wrinkled and is not taut. In this way, unless the non-expanding area 40-1 is in a taut state, the non-expanding area 40-1 cannot catch the head of the occupant, and the head tends to collide with the window pane and the like.

What is claimed is:

1. An airbag, comprising:
a chamber configured to expand due to gas being introduced at a time of deployment; and
a non-expanding area configured to not expand at the time of deployment, wherein
the airbag is configured to deploy by the gas being introduced into the chamber,
a first portion inside the chamber is located around the non-expanding area and includes a tip end portion that is closed,
at the time of deployment, the tip end portion is configured to apply a load to and become in contact with a second portion of the chamber that is located around the non-expanding area and that faces the tip end portion,
the second portion of the chamber includes a portion facing the tip end portion, and
in an area where the tip end portion is in contact with the portion of the second portion, at the time of deployment, the tip end portion is located under the portion of the second portion in a vehicle vertical direction.

2. The airbag according to claim 1, wherein
a recess portion is provided in the portion of the second portion, and
the tip end portion is configured to come into contact with the recess portion so as to enter the recess portion at the time of deployment.

3. The airbag according to claim 1, wherein at the time of deployment, tension in a direction spreading toward a periphery is applied to the non-expanding area due to the chamber around the non-expanding area expanding.

4. The airbag according to claim 1, wherein at the time of deployment, the first portion has a U-shape in which one end is the tip end portion, the second portion is located so as to close an opening of the U-shape of the first portion, and an inner portion surrounded by the first portion and the second portion is the non-expanding area.

5. The airbag according to claim 1, wherein the airbag is a curtain shield airbag that is placed on a vehicle cabin inner side and configured to deploy in a vehicle front-rear direction.

6. The airbag according to claim 1, wherein at the time of deployment, the tip end portion is in contact with the portion of the second portion in a state where the tip end portion is surrounded by the portion of the second portion.

7. The airbag according to claim 1, wherein at the time of deployment, the tip end portion is in contact with the portion of the second portion at a front side of the tip end portion and at a rear side of the tip end portion in a vehicle front-rear direction.

* * * * *